(12) United States Patent
Manzardo

(10) Patent No.: US 7,458,459 B2
(45) Date of Patent: Dec. 2, 2008

(54) CONTAINER AND METHOD OF MAKING A CONTAINER

(75) Inventor: Marcel B. Manzardo, Los Gatos, CA (US)

(73) Assignee: MMDesign Studio International, Inc., Los Gatos, CA (US)

( * ) Notice: Subject to any disclaimer, the term of this patent is extended or adjusted under 35 U.S.C. 154(b) by 472 days.

(21) Appl. No.: 11/176,254

(22) Filed: Jul. 8, 2005

(65) Prior Publication Data

US 2007/0007151 A1    Jan. 11, 2007

(51) Int. Cl.
*B65D 69/00*    (2006.01)

(52) U.S. Cl. .................. 206/232; 206/312; 206/804; 206/815

(58) Field of Classification Search ............ 206/307, 206/307.1, 308.1, 312, 425, 484, 232, 804, 206/815; 281/31, 45
See application file for complete search history.

(56) References Cited

U.S. PATENT DOCUMENTS

| | | | |
|---|---|---|---|
| 5,895,165 A | 4/1999 | Mogelonsky | |
| 5,931,293 A | 8/1999 | Seelenmeyer | |
| 5,947,281 A | 9/1999 | Kaneff | |
| 6,068,117 A | 5/2000 | Koehn | |
| 6,119,381 A | 9/2000 | Grocholski | |
| 6,186,332 B1 | 2/2001 | Combs | |
| 6,241,086 B1 * | 6/2001 | Bergh et al. | 206/308.1 |
| 6,267,234 B1 * | 7/2001 | Bergh et al. | 206/308.1 |
| 6,279,739 B1 | 8/2001 | Moore et al. | |
| 6,349,822 B1 | 2/2002 | Greene | |
| 6,419,084 B1 | 7/2002 | Sandor | |
| 6,443,300 B1 | 9/2002 | Gelardi | |
| 6,443,301 B2 * | 9/2002 | Garnier | 206/312 |
| 6,450,535 B1 | 9/2002 | Shafer | |
| 6,454,091 B1 | 9/2002 | Mendoza et al. | |
| 6,505,739 B2 * | 1/2003 | Garnier | 206/312 |
| 6,523,684 B1 * | 2/2003 | Daniels, Jr. | 206/308.1 |
| 6,705,472 B2 | 3/2004 | Cross et al. | |
| 2001/0020593 A1* | 9/2001 | Koehn | 206/308.1 |
| 2002/0197098 A1* | 12/2002 | Palmer | 402/79 |
| 2003/0029749 A1* | 2/2003 | Exline | 206/308.1 |
| 2003/0173770 A1* | 9/2003 | Bergh et al. | 281/38 |
| 2004/0168938 A1* | 9/2004 | Bergh et al. | 206/312 |

* cited by examiner

*Primary Examiner*—Jacob K. Ackun, Jr.
*Assistant Examiner*—Jose S Stephens, III
(74) *Attorney, Agent, or Firm*—Rissman Jobse Hendricks & Oliverio, LLP

(57) ABSTRACT

A container having a longitudinal dimension may comprise a first pocket member, a second pocket member, and a third pocket member each having substantially the same longitudinal dimension, with the third pocket member being sandwiched between the first and second pocket members. A first pocket may be defined by the second and third pocket members, and a second pocket may be defined by the first and third pocket members. The first, second, and third pocket members may each have a free edge, and the free edges may cooperate with one another to form openings to the first and second pockets.

23 Claims, 4 Drawing Sheets

CONTAINER AND METHOD OF MAKING A CONTAINER

TECHNICAL FIELD

The present invention is directed to a container and a method for making a container. More particularly, the present invention is directed to a container for holding one or more media discs and/or printed materials associated with the media discs.

BACKGROUND

Media discs are popular mediums for the storage of movies, music, videos, computer software, computer games, etc. As used herein, the term "media disc" is intended to encompass any digital storage disc, such as compact discs (CDs) for the storage of digitized music and/or video, CD-ROMs for the storage of digitized data and computer software, digital video discs (DVDs) for the storage of digitized audio and video data, video game discs, and other similar disc formats, whether now known or developed in the future. Such media discs are often packaged in a rigid plastic case and are often accompanied by printed material for sale to consumers.

For example, the printed material may include a cover sheet visible from outside the plastic case. The cover sheet may be between a clear plastic cover and the rigid plastic case. Other discs are packaged in a cardboard case rather than plastic, where the printed material is the cardboard case itself. Some media discs are packaged with a booklet or other printed material contained inside the plastic or cardboard case. All of these types of printed material typically include visually attractive color graphics and/or information representative of the content of the media disc. Since a media disc often does not include easily visible graphics identifying the content of the disc, the printed material may serve to provide an easily visible identification of the content of the disc.

Because the rigid cases take up much more space than the media discs and accompanying printed material, they are often considered a nuisance by users. Some conventional systems collect media discs individually into a booklet having vinyl sleeves bound, for example, in a three-ring binder. However, many of these systems do not provide a mechanism for maintaining the accompanying printed material with the media discs. Some systems may allow storage of the accompanying material, but do so in a manner quite dissimilar from the original visual presentation of the packaged media disc. Consequently, there is a need for an improved media disc container that allows the discs and their accompanying printed materials to be stored and displayed in a space-efficient manner while maintaining a visual presentation similar to the originally-packaged media disc.

SUMMARY OF THE INVENTION

In some aspects, a container having a longitudinal dimension may include a first pocket member, a second pocket member, and a third pocket member. The third pocket member may be sandwiched between the first and second pocket members, with the first, second, and third pocket members having substantially the same longitudinal dimension. A first pocket may be defined by the second and third pocket members, and a second pocket may be defined by the first and third pocket members. The second pocket member may have at least a portion of three edges attached to at least a portion of three corresponding edges of the third pocket member, and the second and third pocket members may each have a free edge. The attached edges may delimit the first pocket, and the free edges may cooperating to form an opening to the first pocket, such that the first pocket may be configured to receive printed material. At least a portion of two of said three edges of the third pocket member may be attached to at least a portion of two corresponding edges of the first pocket member, and a middle region of the third pocket member may be attached to a corresponding middle region of the first pocket member in a direction substantially perpendicular to said longitudinal dimension. The attached edges and the attached region may delimit the second pocket, and the first pocket member may have a free edge cooperating with the free edge of the third pocket member to form an opening to the second pocket, such that the second pocket may be configured to receive at least one media disc.

In some aspects, a container may include a first pocket member, a second pocket member, and a third pocket member. The first, second, and third pocket members may be attached to one another with the third pocket member being sandwiched between the first and second pocket members. The container may include a first pocket defined by the second and third pocket members and a second pocket defined by the first and third pocket members. The first pocket member may have a free edge and a plurality of attached edges. At least one of the attached edges may have a free portion and an attached portion, with the free portion being proximal to the free edge and the attached portion being distal from the free edge. The free edge and the free portion may define a first corner flap that defines an overlap with respect to the second and third pocket members. The overlap may be configured to guide insertion of at least one media disc into the second pocket. The second pocket member may have a free edge and a plurality of attached edges. At least one of said attached edges may have a free portion and an attached portion, with the free portion being proximal to the free edge and the attached portion being distal from the free edge. The free edge and the free portion of the second pocket member may define a second corner flap having a first radius of curvature. The third pocket member may have a free edge and a plurality of attached edges. At least one of the attached edges may have a free portion and an attached portion, with the free portion being proximal to the free edge and the attached portion being distal from the free edge. The free edge and the free portion of the third pocket member may define a third corner flap having a second radius of curvature, with the second radius of curvature being greater than the first radius of curvature. The third corner flap may be configured to guide insertion of an item into the first pocket.

DETAILED DESCRIPTION OF EXEMPLARY EMBODIMENTS

Figure 1:
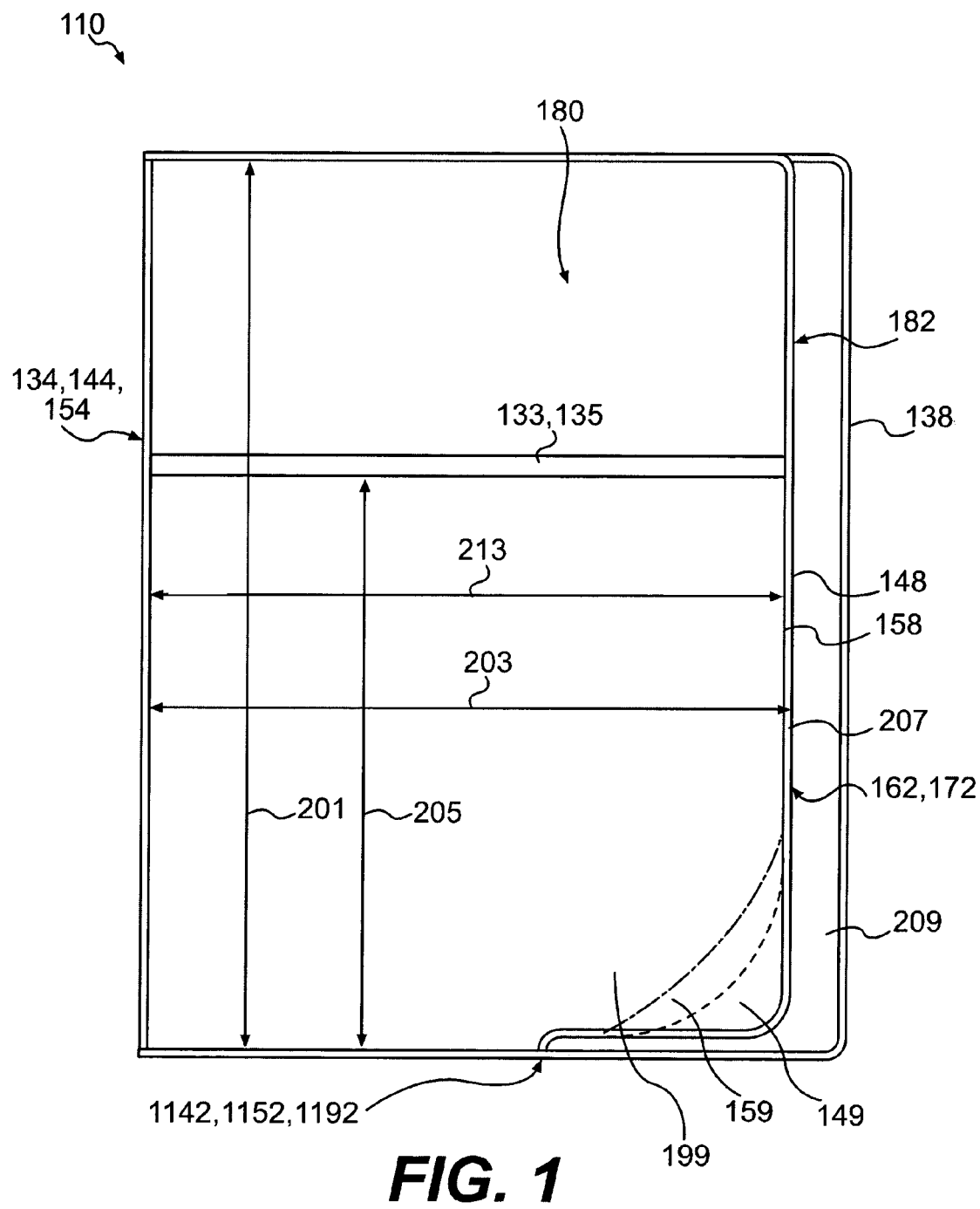
FIG. 1 is a plan view of an exemplary container in accordance with some aspects of the invention.
Figure 2:
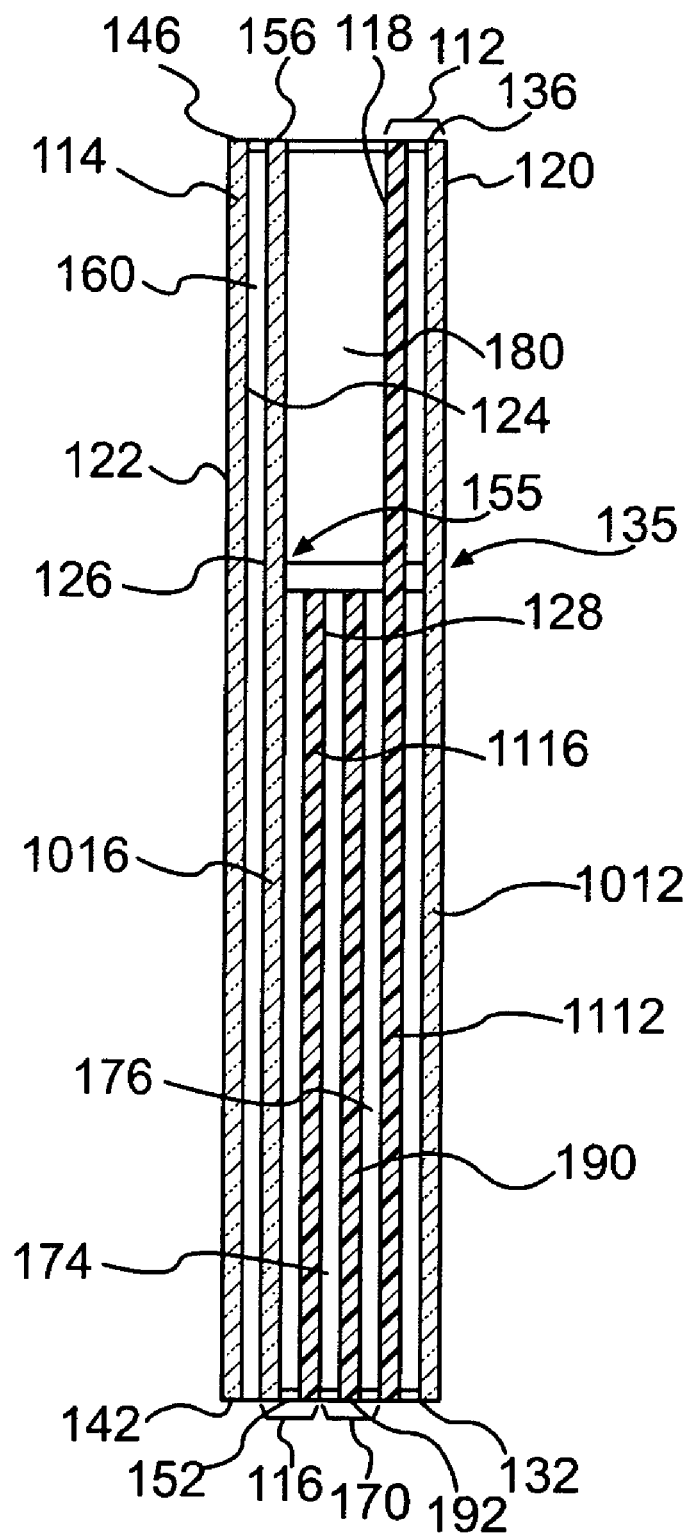
FIG. 2 is a cross-sectional view of the container taken along line II-II of FIG. 1.

An exemplary embodiment of a container 110 is shown in FIGS. 1 and 2. The container 110 may include a first pocket member 112, a second pocket member 114, and a third pocket member 116. The first pocket member 112 may define a back wall of the container, and the second pocket member 114 may define, at least in part, a front wall of the container. The third pocket member 116 may be disposed between the first and second pocket members 112, 114. The first, second, and third pocket members 112, 114, 116 may cooperate to define at least a first pocket 160 and a second pocket 170, as described in more detail below.

The first pocket member 112 may have a front side 118 and a rear side 120. According to various aspects, the first pocket member 112 may be substantially rectangular-shaped, having four edges 132, 134, 136, 138. The four corners between the edges may be slightly rounded for functional and/or aesthetic purposes.

The second pocket member 114 may have a front side 122 and a rear side 124. According to various aspects, the second pocket member 114 may be substantially rectangular-shaped, having four edges 142, 144, 146, 148. The four corners between the edges may be slightly rounded for functional and/or aesthetic purposes.

The third pocket member 116 may have a front side 126 and a rear side 128. According to various aspects, the second pocket member 116 may be substantially rectangular-shaped, having four edges 152, 154, 156, 158. The four corners between the edges may be slightly rounded for functional and/or aesthetic purposes.

The second pocket member 114 may be attached to the front side 126 of the third pocket member 116. For example, according to various aspects, at least a portion of three edges 142, 144, 146 of the second pocket member 114 may be attached, for example, by heat-sealing, to at least a portion of the three corresponding edges 152, 154, 156 of the third pocket member 116. The second and third pocket members 114, 116 may thereby define the first pocket 160, with free edges 148, 158 of the second and third pocket members 114, 116, respectively, providing an opening 162 to the first pocket 160. The first pocket 160 may extend substantially the length 201 and width 203 of the second pocket member 114.

Figure 3:
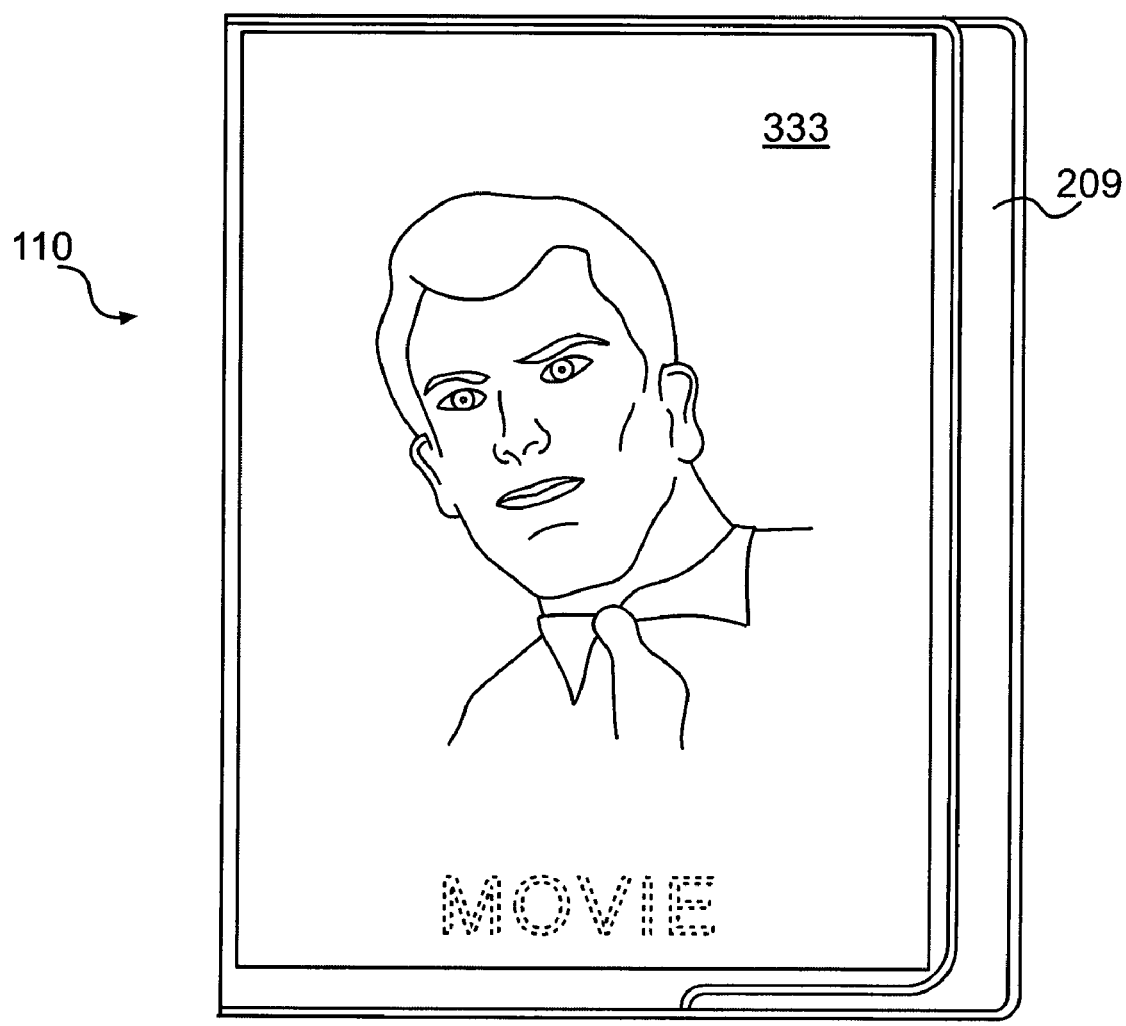
FIG. 3 is a plan view of the exemplary container of FIG. 1 with exemplary printed material therein.

The first pocket 160 may be sized and arranged to receive printed material 333 (FIG. 3) accompanying a dvd, video game, or the like. For example, the length 201 and width 203 of the first pocket 160 may be substantially the same as the length and width of a typical dvd container, video game container, or the like sold in retail establishments. Thus, at least some of the printed material 333 may be substantially secured by the first pocket 160. The printed material 333 may include, for example, a paper dvd or video game cover insert, a cardboard dvd cover, and/or a booklet accompanying a dvd or video game.

The second pocket member 114 may comprise a sheet of plastic laminate. In some embodiments, the laminate may be, for example, a clear plastic laminate that enables a person to visually inspect the printed material 333 in the first pocket 160 by looking through the second pocket member 114 without having to remove the printed material 333 or open the first pocket 160.

According to various aspects, the second pocket member 114 may have a dimension perpendicular to its free edge 148 larger than that of the third pocket member 116, such that the free edge 148 of the second pocket member 114 creates an overlap 207 relative to the free edge 158 of the third pocket member 116. The overlap 207 facilitates insertion of the printed material into the first pocket 160 via the opening 162.

It should be appreciated that the first pocket 160 may be sized and arranged to receive printed material 333 accompanying a compact audio disc or personal computer cdrom. In such a case, the length 201 and width 203 of the first pocket 160 may be substantially the same as the length and width of a typical compact audio disc container, personal computer cdrom container, or the like sold in retail establishments. The printed material 333 may include, for example, a paper cover insert, a cardboard cover, and/or a booklet accompanying a compact audio disc or personal computer cdrom.

The third pocket member 116 may be attached to the front side 118 of the first pocket member 112. According to various aspects, at least a portion of three edges 152, 154, 156 of the third pocket member 116 may be attached, for example, by heat-sealing, to at least a portion of the three corresponding edges 132, 134, 136 of the first pocket member 112.

According to various embodiments, if the length 201 of the container 110 is substantially greater than a diameter of a conventional media disc, the first and third pocket members 112, 116 may be attached across the width 213 of the third pocket member 116 at regions 135, 155 of the first and third pocket members 112, 116, respectively. The attached edges 132, 152, the attached regions 135, 155, and a portion of the attached edges 134, 154 of the first and third pocket members 112, 116 may thereby define the second pocket 170, with at least a portion of free edges 138, 158 of the first and third pocket members 112, 116, respectively, providing an opening 172 to the second pocket 170.

Figure 4:
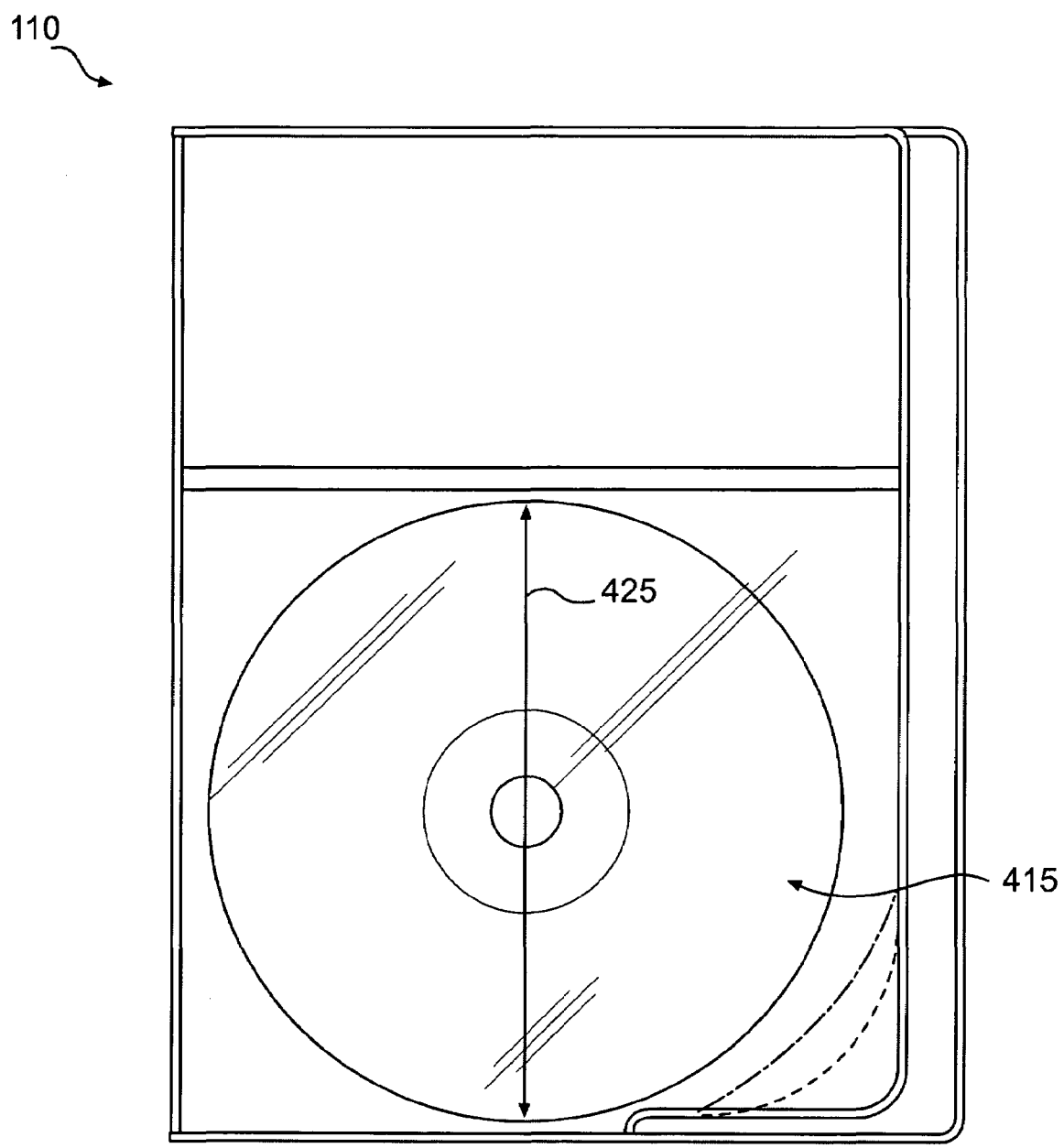
FIG. 4 is a plan view of the exemplary container of FIG. 1 with an exemplary media disc therein.

The second pocket 170 may be sized and arranged to receive at least one media disc 415, as shown in FIG. 4. For example, the second pocket 170 may have a dimension 205 in a direction along the length 201 of the first pocket member 112 that is sized to substantially correspond to a diameter 425 of the media disc 415. For example, the dimension 205 would have to be slightly larger than the diameter 425 in order to receive the disc 415, but should be close enough in size so that the disc 415 is retained in the second pocket 162, for example, via a friction fit, and does not fall out.

Thus, it should be appreciated that if the length 201 of the first pocket 160 is substantially the same as the length of a typical dvd container, video game container, or the like, then the dimension 205 of the second pocket 162 will comprise only a portion of the length 201 of the first pocket 160. However, if the length 201 of the first pocket 160 is substantially the same as the length of a typical compact audio disc container, personal computer cdrom container, or the like, then the dimension 205 of the second pocket 162 will be substantially the same as the length 201 of the first pocket 160. If the dimension 205 is substantially the same as the length 201 of the first pocket 160, attached regions 135, 155 of the first and second pocket members 112, 116 would not be required, and the attached edges 132, 134, 136, 152, 154, 156 would define the second pocket 170.

According to various aspects, the first pocket member 112 may have a dimension perpendicular to its free edge 138 larger than that of the third pocket member 116, such that the free edge 138 of the first pocket member 114 creates an overlap 209 relative to the free edge 158 of the third pocket member 116. The overlap 209 may facilitate insertion of a media disc 415 into the second pocket 170. For example, the third pocket member 116 may be moved relatively away from the overlap 209 and/or a flat surface of a media disc 415 may be placed against a surface of the overlap 209, and the media disc 415 may be directed into the second pocket 170 via the opening 172.

According to various aspects, the first pocket member 112 may comprise one or more sheets. For example, the first pocket member 112 may comprise a sheet 1012 of a plastic laminate. In some embodiments, the laminate may be, for example, a clear plastic laminate and/or a non-scratch plastic laminate. Additionally or alternatively, the first pocket member may comprise a sheet 1112 of a woven or non-woven fabric material; for example, the sheet 1112 may comprise felt, which may or may not comprise wool. In various embodiments, the sheet 1112 may define an interior surface of the second pocket 170. It should be appreciated that the first pocket member 112 may comprise sheet 1012 without sheet 1112 or vice versa. It should further be appreciated that the sheets 1012, 1112 may be separate from one another or adhered to at least a portion of one another, for example, by heat sealing, to form a single piece construction.

According to various aspects, the third pocket member 116 may comprise one or more sheets. For example, the third pocket member 116 may comprise a sheet 1016 of a plastic laminate. In some embodiments, the laminate may be, for example, a clear plastic laminate and/or a non-scratch plastic laminate. Additionally or alternatively, the third pocket member 116 may comprise a sheet 1116 of a woven or non-woven fabric material; for example, the sheet 1116 may comprise felt, which may or may not comprise wool. In various embodiments, the sheet 1116 may define an interior surface of the second pocket 170. It should be appreciated that the second pocket member 116 may include sheet 1016 without sheet 1116 or vice versa. It should further be appreciated that the sheets 1016, 1116 may be separate from one another or adhered to at least a portion of one another, for example, by heat sealing, to form a single sheet.

In some embodiments, for example, where the length 201 of the first pocket 160 is substantially the same as the length of a typical dvd container, video game container, or the like, the first and third pocket members 112, 116 may cooperate to define a third pocket 180. The third pocket 180 may be delimited by the attached edges 136, 156, the attached regions 135, 155, and a second portion of the attached edges 134, 154 of the first and third pocket members 112, 116. It should be appreciated that the location of the second and third pockets 170, 180 may be reversed, with the third pocket 180 being at the bottom of the container 110 and the second pocket 170 at the top of the container, opposite to that which is shown in the figures. The free edges 138, 158 of the first and third pocket members 112, 116 may define an opening 182 to the third pocket 180. The third pocket 180 may be used to store various media-related graphics, reviews, or business cards, or any desired miscellaneous items sized to fit in the third pocket 180.

According to various aspects, the container 110 may include a sheet 190 sandwiched between the first and third pocket members 112, 116 and having dimensions similar to those of the second pocket 170. The sheet 190 may be attached to the first and third pocket members 112, 116 in one or more of the same regions that the third pocket member 116 is attached to the first pocket member 112. The sheet 190 may divide the second pocket 170 into two sub-pockets 174, 176, with each of the sub-pockets being sized and arranged to receive a media disc. The sheet 190 may be, for example, a plastic laminate, a non-woven fabric material, or a woven fabric material. The plastic laminate may be, for example, a non-scratch plastic laminate. The non-woven fabric material may be, for example, felt, which may or may not comprise wool.

In various embodiments, the second pocket member 114 may include a flap 149 defined by a curved free edge extending from the free edge 148 to an attached point 1142 of edge 142. Similarly, the third pocket member 116 may include a flap 159 defined by a curved free edge extending from the free edge 158 to an attached point 1152 of edge 152. The sheet 190 forming the sub-pockets 174, 176 may include a flap 199 extending from a free edge 198 to an attached point 1192 of edge 192. The curved free edges 149, 159, 199 may be located at the same corner 119 of the container 110.

According to various aspects, one or more of the curved free edges 149, 159, 199 may be offset from one another and/or may have different radii of curvature in order to facilitate insertion of a media disc 415 into the second pocket 170 or into one of the sub-pockets 174, 176, or to facilitate insertion of printed material 333 into the first pocket 160. For example, the flap 199 may be moved relatively away from the first pocket member 112 and/or a surface of a media disc 415 may be placed against a surface of the first pocket member 112 forming an interior surface of the sub-pocket 176, and the media disc 415 may be directed into the sub-pocket 176. The overlap 209 may similarly facilitate insertion of a media disc 415 into the sub-pocket 174.

According to various aspects, for example, the flap 159 and second pocket member 114 may be moved relatively away from the first pocket member 112 and/or a surface of a media disc 415 may be placed against a surface of the sheet 190 forming an interior surface of the sub-pocket 172, and the media disc 415 may be directed into the sub-pocket 384.

According to some aspects, for example, the flap 149 of the second pocket member 114 may be moved relatively away from the third pocket member 116 and/or a surface of printed material 333 may be placed against a surface of the second pocket member 114 forming an interior surface of the first pocket 160, and the printed material 333 may be directed into the first pocket 160.

It should be appreciated that the container 110 may be used to contain, display, and/or store one or more media discs 410 such as, for example, CDs, video CDs, CD-ROMs, DVDs, and/or video game discs. It should also be appreciated that the container 110 may be used to contain, display, and/or store printed material associated with the one or more media discs 415. The printed material 333 may include, for example, a cardboard media disc cover, a paper cover sheet, and/or an informational booklet.

In one exemplary use of the container 110, the printed material 333 may be inserted into the first pocket 160 via the opening 162. The printed material 333 may be, for example, a folded cover sheet of an originally-packaged media disc, with the front portion of the cover sheet visible through the second pocket member 114. One or more media discs 415 may be inserted into the second pocket 170 via the opening 172. In one aspect of the container 110 that may include a sheet 190 defining sub-pockets 174, 176, one or more media discs 415 may be inserted into one sub-pocket 174 and/or one or more media discs 415 may be inserted into the other sub-pocket 176. One skilled in the art should recognize that the order of inserting the discs and/or printed material may be varied as desired by the user.

It should be appreciated that as long as the interior surfaces of the second pocket 170 comprise a fabric material or a non-scratch laminate, the orientation of the media disc in the second pocket 170 is reversible. For example, if the media disc contains information on only one side of the disc ("one-sided" disc), that surface of the disc (and thus the information stored thereon) will be protected regardless of which interior surface of the second pocket 170 it faces. Further, both surfaces of a media disc containing information on both sides ("two-sided" disc) will also be protected by the interior surfaces of the second pocket 170. In embodiments having the second pocket 170 divided into two sub-pockets 174, 176 by the sheet 190, which comprises a fabric material or a non-scratch laminate, the information surface of one-sided discs will be protected regardless of the orientation of the discs 415 in the sub-pockets 174, 176, and both sides of two-sided discs will be protected as well.

It should be appreciated that the first pocket member 112 and the first pocket 160 may be sized and arranged to accommodate cardboard media disc covers, which are typically larger than the paper cover sheets and booklets. When containing the paper cover sheets and the cardboard media disc covers, the user may position their spine so that it will be visible from the front of the container 110

It should be appreciated that a plurality of exemplary containers 110 may be stored and/or displayed in various ways. For example, the containers may be stored in a covered housing, an open tray, or the like. In one aspect, each container 110 may be inserted into an adaptor (not shown) for compilation in a binder or the like. For example, the adaptor may include holes arranged for alignment with 2-ring binders, 3-ring binders, and/or the like. The adaptor may comprise a sleeve with three sealed edges and an open edge for receiving the container 110. For example, the adaptor may receive the end of the container 110 opposite to the free edges 138, 148, 158.

It will be apparent to those skilled in the art that various modifications and variations can be made to the container and method of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A container, comprising:
    a first pocket member, a second pocket member, and a third pocket member, the third pocket member being sandwiched between the first and second pocket members;
    a first pocket defined by the second and third pocket members, the second pocket member having at least a portion of three edges attached to at least a portion of three corresponding edges of the third pocket member, the second and third pocket members each having a free edge, the attached edges delimiting the first pocket, the free edges cooperating to form an opening to the first pocket, the first pocket being configured to receive printed material, at least one of said attached edges of the third pocket member having a free portion and an attached portion, the free portion being proximal to the free edge of the third pocket member and the attached portion being distal from the free edge of the third pocket member; and
    a second pocket defined by the first and third pocket members, at least a portion of two of said three edges of the third pocket member being attached to at least a portion of two corresponding edges of the first pocket member, a middle region of the third pocket member being attached to a corresponding middle region of the first pocket member, the attached edges and the attached middle regions delimiting the second pocket, the first pocket member having a free edge cooperating with said free edge of the third pocket member to form an opening to the second pocket, said attached middle regions extending substantially perpendicular to the opening to the second pocket, the second pocket being configured to receive at least one media disc.

2. The container of claim 1, wherein the container has a longitudinal dimension, said openings to the first and second pockets being directed substantially perpendicular to said longitudinal dimension.

3. The container of claim 1, wherein a dimension of the second pocket in a direction of said longitudinal dimension is sized to substantially correspond to a diameter of said at least one media disc.

4. The container of claim 1, wherein the first and third pocket members cooperate to define a third pocket, the third pocket being delimited by said attached middle regions of the first and third pocket members and at least a portion of two of said three edges of the third pocket member being attached to at least a portion of two corresponding edges of the first pocket member, at least one of said two attached edges of the first and third pocket members being different from said two attached edges defining the second pocket, said free edges of the first and third pocket members cooperating to define an opening to the third pocket.

5. The container of claim 1, further comprising a sheet sandwiched between at least a portion of the first and third pocket members, the sheet dividing the second pocket into two sub-pockets, each of the sub-pockets being configured to receive at least one media disc.

6. The container of claim 5, wherein the sheet comprises a material chosen from a woven fabric and a non-woven fabric.

7. The container of claim 5, wherein the first pocket member comprises a first corner flap that defines an overlap with respect to the second and third pocket members, the overlap being configured to guide insertion of at least one media disc into one of the sub-pockets,
    wherein the second pocket member comprises a second corner flap having a first radius of curvature and the third pocket member comprises a third corner flap having a second radius of curvature, the second radius of curvature being greater than the first radius of curvature, the third corner flap being configured to guide insertion of an item into the first pocket, and
    where the sheet comprises a fourth corner flap having a third radius of curvature, the third radius of curvature being greater than the second radius of curvature, the fourth corner flap being configured to guide insertion of at least one media disc into another one of the sub-pockets.

8. The container of claim 1, wherein at least one of the first, second, and third pocket members comprises a plastic laminate.

9. The container of claim 8, wherein the plastic laminate of at least one of the first and third pocket members comprises a non-scratch laminate.

10. The container of claim 8, wherein at least one of the first and third pocket members comprises a material chosen from a woven fabric and a non-woven fabric defining an interior surface of the second pocket.

11. The container of claim 1, wherein the at least one media disc is chosen from the group of digital video discs and compact disc, and
    wherein the printed material comprises at least one of a cardboard digital video disc cover, a paper digital video disc insert, and an informational booklet.

12. The container of claim 1, wherein the first pocket member comprises a first corner flap that defines an overlap with respect to the second and third pocket members, the overlap being configured to guide insertion of at least one media disc into the second pocket, and
    wherein the second pocket member comprises a second corner flap having a first radius of curvature and the third pocket member comprises a third corner flap having a second radius of curvature, the second radius of curvature being greater than the first radius of curvature, the third corner flap being configured to guide insertion of an item into the first pocket.

13. A container, comprising:

a first pocket member, a second pocket member, and a third pocket member, the first, second, and third pocket members being attached to one another with the third pocket member being sandwiched between the first and second pocket members;

a first pocket defined by the second and third pocket members;

a second pocket defined by the first and third pocket members;

the first pocket member having a free edge and a plurality of attached edges, at least one of said attached edges having a free portion and an attached portion, the free portion being proximal to the free edge and the attached portion being distal from the free edge, the free edge and the free portion defining a first corner flap that defines an overlap with respect to the second and third pocket members, the overlap being configured to guide insertion of at least one media disc into the second pocket;

the second pocket member having a free edge and three attached edges, said attached edges delimiting the first pocket, at least one of said attached edges having a free portion and an attached portion, the free portion being proximal to the free edge and the attached portion being distal from the free edge, the free edge and the free portion of the second pocket member defining a second corner flap having a first radius of curvature; and the third pocket member having a free edge and a plurality of attached edges, at least one of said attached edges having a free portion and an attached portion, the free portion being proximal to the free edge and the attached portion being distal from the free edge, the free edge and the free portion of the third pocket member defining a third corner flap having a second radius of curvature, the second radius of curvature being greater than the first radius of curvature, the third corner flap being configured to guide insertion of an item into the first pocket.

14. The container of claim 13, wherein the free edges of the second and third pocket members cooperate to form an opening to the first pocket, and the free edges of the first and third members cooperate to form an opening to the second pocket.

15. The container of claim 14, wherein the container has a longitudinal dimension and said openings to the first and second pockets are directed substantially perpendicular to said longitudinal dimension.

16. The container of claim 14, wherein a dimension of the second pocket in a direction of said longitudinal dimension is sized to substantially correspond to a diameter of said at least one media disc.

17. The container of claim 13, wherein the first and third pocket members cooperate to define a third pocket, the third pocket being separated from the second pocket by a middle region of the third pocket member being attached to a corresponding middle region of the first pocket member in a direction substantially perpendicular to said longitudinal dimension, said free edges of the first and third pocket members cooperating to define an opening to the third pocket.

18. The container of claim 13, further comprising a sheet sandwiched between at least a portion of the first and third pocket members, the sheet dividing the second pocket into two sub-pockets, each of the sub-pockets being configured to receive at least one media disc, the sheet having a free edge and a plurality of attached edges, at least one of said attached edges having a free portion and an attached portion, the free portion being proximal to the free edge and the attached portion being distal from the free edge, the free edge and the free portion of the sheet defining a fourth corner flap having a third radius of curvature, the third radius of curvature being greater than the second radius of curvature, the fourth corner flap being configured to guide insertion of at least one media disc into one of the sub-pockets and the first corner flap being configured to guide insertion of at least one media disc into another one of the sub-pockets of the second pocket.

19. The container of claim 13, wherein the sheet comprises a material chosen from a woven fabric and a non-woven fabric.

20. The container of claim 13, wherein at least one of the first, second, and third pocket members comprises a plastic laminate, the plastic laminate of at least one of the first and third pocket members comprising a non-scratch laminate.

21. The container of claim 20, wherein at least one of the first and third pocket members comprises a material chosen from a woven fabric and a non-woven fabric defining an interior surface of the second pocket.

22. The container of claim 13, wherein the at least one media disc is chosen from the group of digital video discs and compact disc, and wherein the printed material comprises at least one of a cardboard digital video disc cover, a paper digital video disc insert, and an informational booklet.

23. A container, comprising:

a first pocket member, a second pocket member, and a third pocket member, the third pocket member being sandwiched between the first and second pocket members;

a first pocket defined by the second and third pocket members, the second pocket member having at least a portion of three edges attached to at least a portion of three corresponding edges of the third pocket member, the second and third pocket members each having a free edge with respect to one another, the attached edges delimiting the first pocket, the free edges cooperating to form an opening to the first pocket, the first pocket being configured to receive printed material, at least one of said attached edges of the second pocket member having a free portion and an attached portion, the free portion being proximal to the free edge of the second pocket member and the attached portion being distal from the free edge of the second pocket member; and a second pocket defined by the first and third pocket members, at least a portion of two of said three edges of the third pocket member being attached to at least a portion of two corresponding edges of the first pocket member, a middle region of the third pocket member being attached to a corresponding middle region of the first pocket member, the attached edges and the attached middle regions delimiting the second pocket, the first and third pocket members each having a free edge with respect one another, the respective free edges between the first and third pocket members cooperating to form an opening to the second pocket, said attached middle regions extending substantially perpendicular to the opening to the second pocket, the second pocket being configured to receive at least one media disc, at least one of said attached edges of the first pocket member having a free portion and an attached portion, the free portion being proximal to the free edge of the first pocket member and the attached portion being distal from the free edge of the first pocket member.

* * * * *